United States Patent [19]

Sanders

[11] Patent Number: 5,344,174
[45] Date of Patent: Sep. 6, 1994

[54] TRAILER COUPLING WITH FRICTION DAMPER

[76] Inventor: Teun J. H. L. Sanders, Benedendorpsweg 137, Oosterbeek, Netherlands, 6862 WG

[21] Appl. No.: 50,031
[22] PCT Filed: Oct. 30, 1991
[86] PCT No.: PCT/NL91/00214
  § 371 Date: Apr. 29, 1993
  § 102(e) Date: Apr. 29, 1993
[87] PCT Pub. No.: WO92/07727
  PCT Pub. Date: May 14, 1992

[30] Foreign Application Priority Data
  Oct. 30, 1990 [NL] Netherlands ............... 9002357
[51] Int. Cl.⁵ ............................................. B60D 1/00
[52] U.S. Cl. ...................................... 280/504; 280/511
[58] Field of Search ............... 280/504, 507, 508, 511

[56] References Cited

U.S. PATENT DOCUMENTS

| | | | |
|---|---|---|---|
| 2,204,882 | 6/1940 | Berluti | 280/511 |
| 2,219,955 | 10/1940 | Gilmore | 280/511 |
| 2,732,222 | 1/1956 | Harroun et al. | 280/512 |

FOREIGN PATENT DOCUMENTS

| | | |
|---|---|---|
| 0320202 | 6/1989 | European Pat. Off. ............ 280/504 |
| 0373566 | 6/1990 | European Pat. Off. |
| 553337 | 6/1932 | Fed. Rep. of Germany . |
| 944166 | 6/1956 | Fed. Rep. of Germany . |
| 2204548 | 11/1988 | United Kingdom ............... 280/504 |

Primary Examiner—Margaret A. Focarino
Assistant Examiner—Victor E. Johnson
Attorney, Agent, or Firm—Wegner, Cantor, Mueller & Player

[57] ABSTRACT

A trailer coupling including a housing, one wall of which forms a first part-spherical coupling surface, a movable coupling element which is movably mounted on the housing and which forms a second part-spherical coupling surface, a control lever pivotally mounted on the housing and operable by an operating handle connected with the control lever, the control lever being engageable with the movable coupling element for displacement of the movable coupling element between an open position, in which the movable coupling element is at a distance from the first coupling surface, and an engaging position, in which the movable coupling element is close to the first coupling surface, where at least one of the coupling surfaces carries friction material, and where resilient pre-loading structure is arranged for constraining the movable coupling element into the engaging position with a pre-loading towards the first coupling surface, the pre-loading structure being arranged between an engaging point on the operating handle and an engaging point on the housing, such that the pre-loading of the pre-loading structure is transferred from the operating handle to the control lever and from there onto the movable coupling element.

12 Claims, 1 Drawing Sheet

TRAILER COUPLING WITH FRICTION DAMPER

This application is a 371 of PCT/NL91/00214 filed Oct. 30, 1991.

The invention relates to a trailer coupling of the type with a built-in friction damper.

BACKGROUND OF THE INVENTION

Such a coupling is known for example from the German "Offenlegungsschrift" 3 511 301. In the coupled situation, friction material of the coupling surfaces is pressed with a pre-loading against the surface of the towing ball of the pulling vehicle. Relative movements in the coupling, which are caused for instance because the trailer snakes behind the pulling vehicle, are damped by the friction force occurring in the coupling.

In the known trailer coupling the pre-loading is adjusted by means of a wedge driven by a screw which, when the screw is tightened, constrains a movable coupling element towards a coupling surface connected fixedly to the housing. This known coupling has the drawback that two separate operations have to be performed during coupling and uncoupling, namely, on the one hand operating the coupling itself and on the other setting or applying the pre-loading force. Furthermore, the pre-loading force is solely determined by the relative position of the wedge, so that with wear of the coupling material the friction force decreases and the pre-loading has to be adjusted once again. A correct pre-loading must thereby be set repeatedly, which makes the coupling awkward to use. This is all the more so the case when the same trailer has to be pulled by different vehicles. Since the diameter of the pulling coupling depends on the wear thereof, the pre-loading will have to be adapted repeatedly herein also.

SUMMARY OF THE INVENTION

These drawbacks are obviated with the trailer coupling according to the invention including a housing, one wall of which forms a first part-spherical coupling surface, a movable coupling element which is movably mounted on the housing and which forms a second part-spherical coupling surface, a control lever pivotally mounted on the housing and operable by an operating handle connected with the control lever, said control lever being engageable with the movable coupling element for displacement of the movable coupling element between an open position, in which the movable coupling element is at a distance from the first coupling surface, and an engaging position, in which the coupling element is close to the first coupling surface, wherein at least one of the coupling surfaces carries friction material, and wherein resilient pre-loading means are arranged for constraining the movable coupling element into the engaging position with a pre-loading towards the first coupling surface, said pre-loading means being pivotally connected to an engaging point on the operating handle and pivotally connected to an engaging point on the housing, such that the pre-loading of the pre-loading means is transferred from the operating handle to the control lever and therefrom onto the movable coupling element when said coupling element is in said engaging position.

BRIEF DESCRIPTION OF THE DRAWINGS

These and other aspects of the invention are apparent from the purely exemplary, and therefore not restrictive, embodiments illustrated in the following drawings, in which.

DETAILED DESCRIPTION OF PREFERRED EMBODIMENTS

Figure 1:
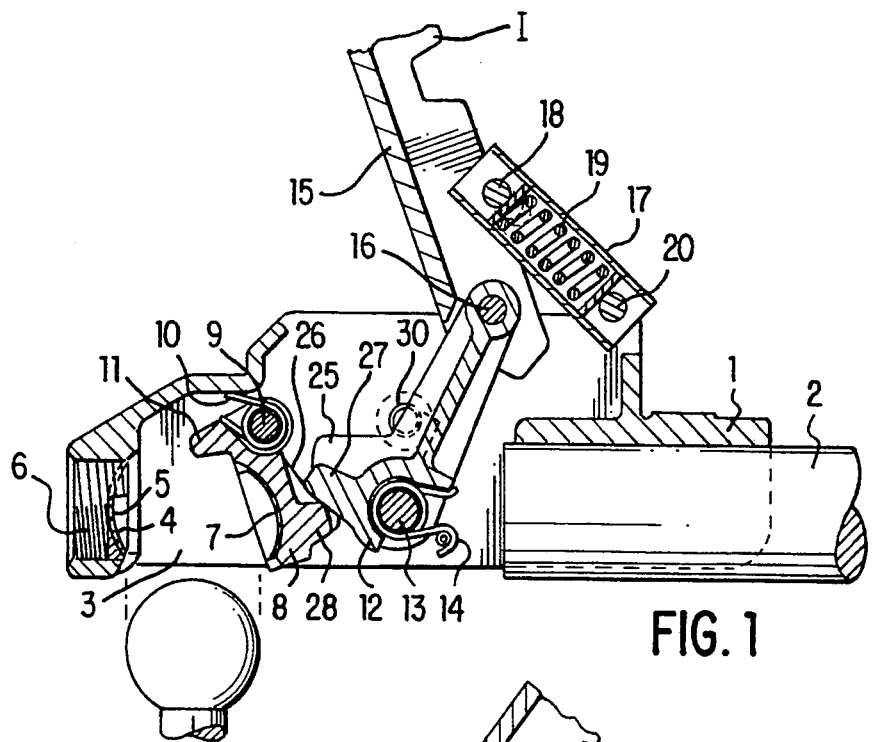
FIG. 1 illustrates a longitudinal section view of an embodiment according to the present invention in a position I.
Figure 2:
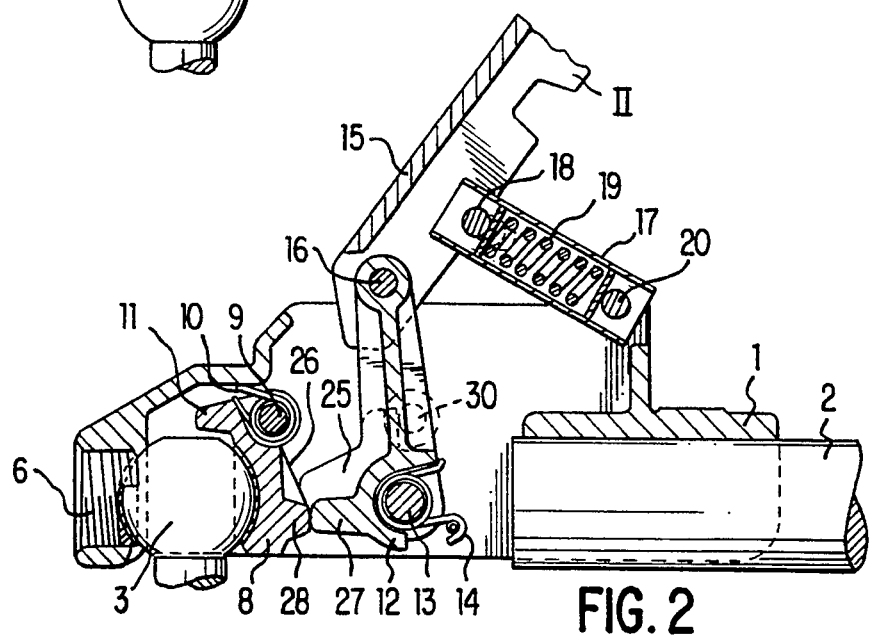
FIG. 2 illustrates a longitudinal section view of an embodiment according to the present invention in a position II.
Figure 3:
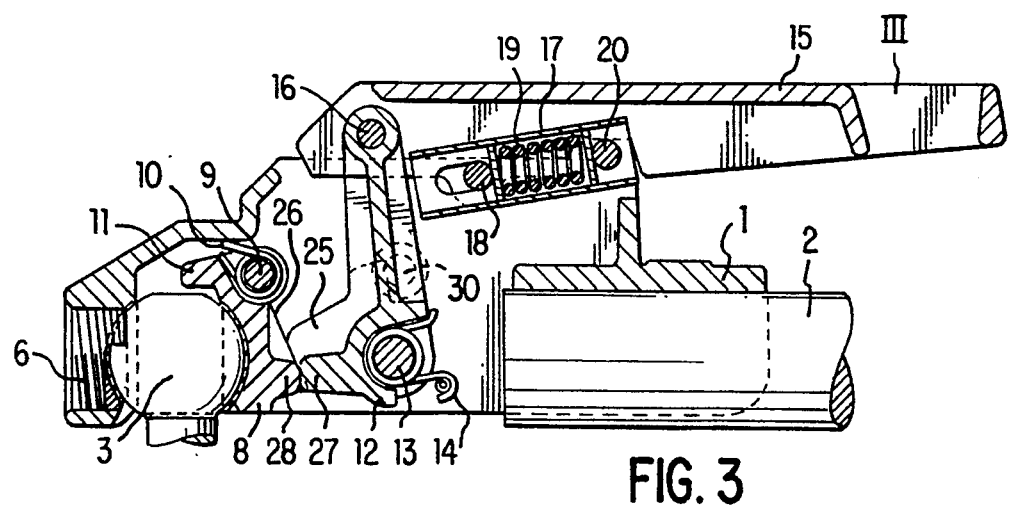
FIG. 3 illustrates a longitudinal section view of an embodiment according to the present invention in a position III.

The coupling comprises a housing 1 which can be mounted in the usual manner to a drawbar 2 of a trailer.

In a foremost part of the housing 1 a spherical space 3 is defined in which the coupling ball of a pulling vehicle can be enclosed. Enclosure takes place between a part-spherical surface 4 fixedly connected to the housing 1 and a part-spherical surface that is integrally formed with a coupling element 8 pivotable round a shaft 9 connected to the housing 1.

The part-spherical coupling surface 4 is covered with a friction material 5 and recessed into a screw element 6 that can be screwed from left to right as seen in the figure, in order to adjustably displace the coupling surface 4 in the direction towards the movable coupling element 8. The movable coupling element 8 is loaded in anti-clockwise direction by a spring 10 arranged around the pivot pin 9. When the coupling is placed on a coupling ball the top end of the ball comes into contact with a protrusion 11 on the movable coupling element 8 whereby this element 8 is swivelled in clockwise direction counter to the force of the spring 9 to the coupled situation shown as position III. The uncoupled situation is likewise shown as position I.

In a manner to be described further the coupling element 8 is locked into the coupled situation by a control lever 12 and resiliently loaded in the direction towards the fixed coupling part 4, so that the coverings 5, 7 of friction material are clamped against the coupling ball for generating a friction force which prevents that relative movement and thereby damps possible snaking of the trailer.

The control lever 12 is pivotally mounted in the housing 1 by means of a pivot pin 13. Arranged round the pivot pin 13 is a spring 14 which loads the control lever 12 in anti-clockwise direction. An operating handle 15 is pivotally arranged by means of a pivot pin 16 on the top end of the control lever 12. A spring sleeve 17 is pivotally mounted to the housing 1 at a distance from the pivot pin 16 by means of a pivot pin 20. The spring sleeve 17 comprises a slot-like hole 21 through which extends a pin 18 which in turn is fixedly joined to the handle 15. A helical pressure spring 19 is arranged between the pin 18 joined to the handle 15 and the pin 20 connected to the housing 1. A spring-loaded toggle lever mechanism is thus formed. This toggle lever mechanism ensures that when the lever 15 is pressed from the position I via the position II into the position III, a dead point is passed so that the handle 15 is in a stable situation in the position III.

In the position III a first protrusion 25 of the control lever 12 is in contact with a protrusion 26 of the locking element 8. The spring 19 presses the pin 18 and therefore the handle 15 connected thereto to the left relative to the housing 1, so that the lever 12 is pushed to the left with spring force at the location of the pivot pin 16. This resilience is transmitted via the protrusion 25 onto the protrusion 26 of the coupling element 8, whereby the above-mentioned spring-loaded engaging of the coupling ball, and thereby the friction damping, is thus achieved. Any wear of the coverings 5, 7 of friction material can be compensated and a setting of the friction force can be obtained by adjusting the screw element 6.

The basic setting of the friction force in accordance with the regulations in a country takes place with a suitable thickness of the discs between which is received the spring in the spring sleeve 17.

In addition to the protrusions 25, 26 for resiliently pressing the coupling element 8, a second set of protrusions 27, 28 are present on the control lever 12 and the coupling element 8 respectively. These come into engagement when the control lever 12 is turned so far to the right that the protrusion 25 exerts no or virtually no biasing force on the protrusion 26. The incline of the contact surfaces of the protrusions 27 and 28 relative to the centres of rotation of the control lever 12 and the coupling element 8 respectively is such that when the protrusions 27 and 28 come into mutual contact they have a locking effect and the coupling could not therefore be opened by a force directed to the right on the coupling element 8. The protrusions 27 and 28 thus prevent the coupling disengaging due to a strong backward impact on the control element 8 or for example due to breakage of the spring 19 and/or the spring 14.

The spring sleeve 17 gives extra protection. As can be seen clearly in the figure, in the position III the sleeve 17 bounds the backward movement of the lever 12 by direct contact.

It will be apparent that when the operating handle 15 is set in the position I, the coupling element 8 lies in the position wholly pivoted to the left. After the coupling is placed on the coupling ball and the coupling element 8 is pivoted back in the above described manner, the control lever 12 can swivel into the engaging position under the influence of the spring 14, wherein the handle moves into position II. Due to co-action of the protrusions 27 and 28 the coupling is in this position already locked. By pressing down the handle 15 from position II to III the biasing force of spring 19 is transferred via the protrusion 25 onto the protrusion 26 and the friction damping is operational.

As extra protection a schematically designated locking pin 30 can be arranged which grips behind the control lever 12 and must for example be pulled counter to the spring force out of the path of movement of the lever 12 in order to be able to move the lever 12 into the uncoupled situation corresponding with position I of the handle 15.

It will be apparent from the above that the coupling can also be used with the handle in position II, in which case the spring 19 is not active and therefore no friction damping will occur. The position II can therefore be used when maneuvering the trailer.

In addition to compensating for wear of the coverings 5, 7 of friction material the screw 6 likewise serves for setting the magnitude of the friction force. By screwing the screw 6 further in, the friction force increases.

The protrusions 25, 26 are embodied such that they are not self-braking, i.e. the lever 12 can be pivoted away by the coupling element 8, until of course the protrusions 27 and 28 come into mutual contact. The spring loading on the friction elements 4, 7 hereby remains substantially constant. In the operational state the coupling damps both snaking and pitching movements of the trailer.

I claim:

1. A trailer coupling comprising a housing, one wall of which forms a first part-spherical coupling surface, a movable coupling element which is movably mounted on the housing and which forms a second part-spherical coupling surface, a control lever pivotally mounted on the housing and operable by an operating handle connected with the control lever, said control lever being engageable with the movable coupling element for displacement of the movable coupling element between an open position, in which the movable coupling element is at a distance from the first coupling surface, and an engaging position, in which the coupling element is close to the first coupling surface, wherein at least one of the coupling surfaces carries friction material, and wherein resilient pre-loading means are arranged for constraining the movable coupling element into the engaging position with a pre-loading towards the first coupling surface, said pre-loading means being pivotally connected to an engaging point on the operating handle and pivotally connected to an engaging point on the housing, such that the pre-loading of the pre-loading means is transferred from the operating handle to the control lever and therefrom onto the movable coupling element when said coupling element is in said engaging position.

2. The trailer coupling as claimed in claim 1 wherein the pre-loading means comprise a toggle lever mechanism, that engages via a pre-loading spring the housing and onto the control lever, such that in a stable position of the toggle lever mechanism over the dead center point a force is continuously exerted on the control lever by the pre-loading spring.

3. The trailer coupling as claimed in claim 2 wherein the toggle lever mechanism is connected to the operating handle with a pin.

4. The trailer coupling as claimed in claim 1 wherein the control lever comprises a first protrusion which co-acts in the engaging position with a first protrusion on the movable coupling element, wherein the protrusion of the control lever is formed such that it prevents a returning movement of the coupling element.

5. The trailer coupling as claimed in claim 4 wherein the control lever comprises a second protrusion which co-acts in the engaging position with a second protrusion on the movable coupling element, wherein the second protrusion is formed such that after the first protrusions have come into mutual engagement, it can transfer the biasing force of the pre-loading spring.

6. The trailer coupling as claimed in claim 1 wherein the first part-spherical coupling surface forms part of a screw element which engages in the housing and which is adjustable by rotation in the direction toward the control lever and back.

7. The trailer coupling as claimed in claim 2 wherein the control lever comprises a first protrusion which co-acts in the engaging position with a first protrusion on the movable coupling element, wherein the protrusion of the control lever is formed such that it prevents a returning movement of the coupling element.

8. The trailer coupling as claimed in claim 3 wherein the control lever comprises a first protrusion which co-acts in the engaging position with a first protrusion on the movable coupling element, wherein the protrusion of the control lever is formed such that it prevents a returning movement of the coupling element.

9. The trailer coupling as claimed in claim 2 wherein the first part-spherical coupling surface forms part of a screw element which engages in the housing and which is adjustable by rotation in the direction toward the control lever and back.

10. The trailer coupling as claimed in claim 3 wherein the first part-spherical coupling surface forms part of a screw element which engages in the housing and which is adjustable by rotation in the direction toward the control lever and back.

11. The trailer coupling as claimed in claim 4 wherein the first part-spherical coupling surface forms part of a screw element which engages in the housing and which is adjustable by rotation in the direction toward the control lever and back.

12. The trailer coupling as claimed in claim 5 wherein the first part-spherical coupling surface forms part of a screw element which engages in the housing and which is adjustable by rotation in the direction toward the control lever and back.

* * * * *